United States Patent [19]

Marshall

[11] Patent Number: 4,627,791
[45] Date of Patent: Dec. 9, 1986

[54] AEROELASTICALLY RESPONSIVE COMPOSITE PROPELLER

[76] Inventor: Andrew C. Marshall, 2147 Wilmington Dr., Walnut Creek, Calif. 94596

[21] Appl. No.: 440,761

[22] Filed: Nov. 10, 1982

[51] Int. Cl.[4] .................... B64C 11/26; B64C 11/34
[52] U.S. Cl. ........................... 416/132 R; 416/230; 416/240; 416/241 A
[58] Field of Search .............. 416/230, 240, 229 R, 416/132 R, 132 A, 240 A, 241 B

[56] References Cited

U.S. PATENT DOCUMENTS

| | | | |
|---|---|---|---|
| 1,367,132 | 2/1921 | Frederick | 416/230 X |
| 1,447,994 | 3/1923 | Lochman | 416/229 |
| 1,618,968 | 3/1927 | Clay | 416/229 |
| 1,875,597 | 9/1932 | Heath | 416/230 |
| 1,919,588 | 7/1933 | Heath | 416/240 A X |
| 2,485,827 | 10/1949 | Hartzell | 416/230 |
| 3,033,293 | 5/1962 | Bihlmire | 416/240 R |
| 3,224,509 | 12/1965 | Thompson | 416/240 R |
| 3,602,608 | 8/1971 | Morley | 416/230 X |
| 3,883,267 | 5/1975 | Baudier et al. | 416/230 |
| 3,942,231 | 3/1976 | Whitaker | 416/230 X |
| 4,022,547 | 5/1977 | Stanley | 416/230 |
| 4,037,988 | 7/1977 | Laird | 416/241 A X |
| 4,347,038 | 8/1982 | Hayashi et al. | 416/240 R X |

FOREIGN PATENT DOCUMENTS

| | | | |
|---|---|---|---|
| 444946 | 6/1927 | Fed. Rep. of Germany | 416/229 R |
| 2243132 | 2/1974 | Fed. Rep. of Germany | 416/230 R |
| 1328167 | 8/1973 | United Kingdom | 416/230 |

*Primary Examiner*—Everette A. Powell, Jr.
*Attorney, Agent, or Firm*—Townsend and Townsend

[57] ABSTRACT

A propeller blade made of an advanced composite of uniaxial fibers laminated in crossplies to take advantage of their high axial strength. The thinness and strength of the plies are exploited in assembling the plies at various orientations to produce propeller blades which respond to changing aerodynamic loads in the complex ways necessary to maintain an optimum shape.

10 Claims, 9 Drawing Figures

U.S. Patent   Dec. 9, 1986   4,627,791
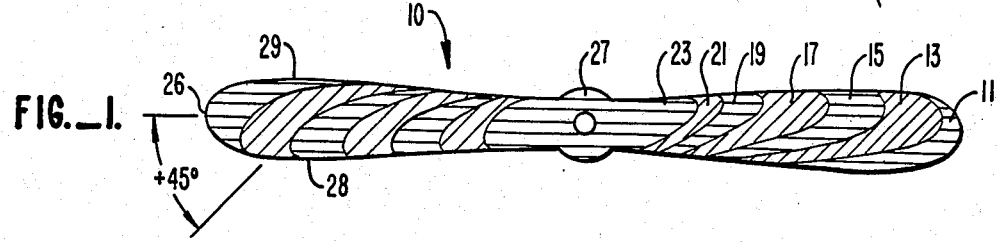
FIG._1.
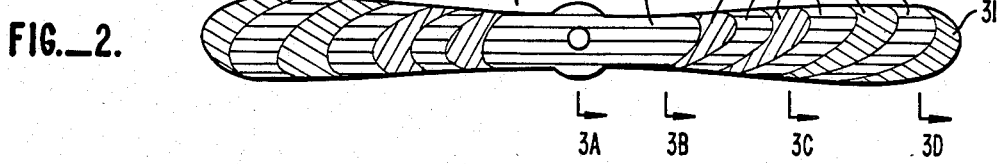
FIG._2.
   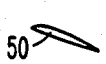
FIG._3A.   FIG._3B.   FIG._3C.   FIG._3D.
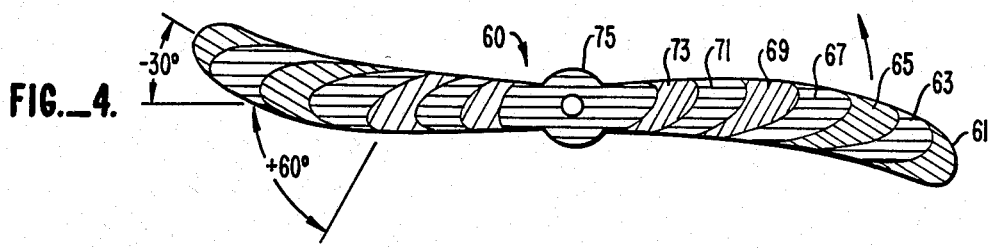
FIG._4.
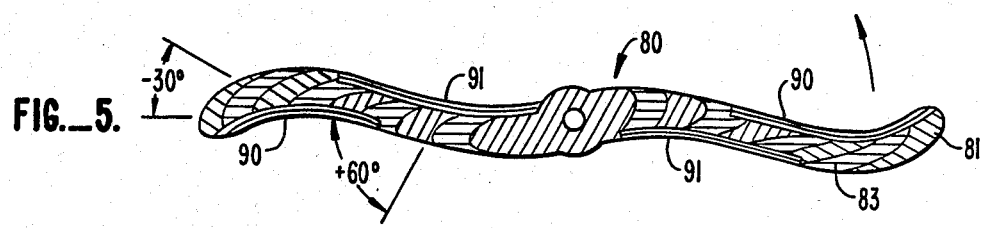
FIG._5.
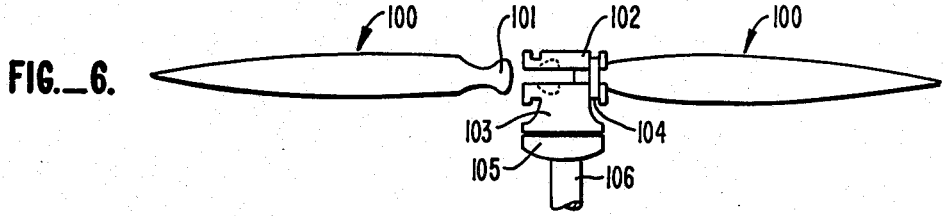
FIG._6.

AEROELASTICALLY RESPONSIVE COMPOSITE PROPELLER

BACKGROUND OF THE INVENTION

1. Field of the Invention

The present invention relates to propellers and more specifically to an aeroelastic unitary laminated composite propeller.

2. Prior Art

Any propeller has a single most efficient pitch or angle of attack on the fluid through which it moves. An ideal perfectly rigid fixed-pitch propeller would be optimally pitched at only one speed and loading. Although actual pitch remains constant, the effective pitch of a propeller varies according to its forward and rotational speed relative to the fluid. The lower the forward speed the greater the effective angle of attack at a given rotational speed. The effective angle of attack and hence the resistance to rotation through a fluid is greatest at take-off or launching, when fluid resistance tends to prevent a typical engine from attaining the high rotational speed at which it produces the necessary maximum power. At cruising speed the effective angle is reduced and a greater actual angle is acceptable.

Variable pitch propellers are a well-known technique for changing the actual angle and thus improving the effective pitch, and offer the advantage that they can be designed to operate at a constant rotational speed, thus allowing the engine to operate at its single most efficient speed while producing different amounts of power at different forward velocities. However, variable pitch propellers have always been constructed from several pieces including a hub, bearings and articulated blades. Propellers using mechanisms to adjust pitch generally weigh twice as much as unitary propellers, need considerable maintenance, are failure prone, and are expensive. The propeller pitch can only be varied at the joint between the hub and each blade, and each blade is rotated as a rigid unit. Such variable pitch propellers have a narrow optimal range of operating conditions and are less efficient outside of that range. The range is much narrower for conventional unitary propellers.

Previous "aeroelastic" propellers have been made from homogeneous metal, wood or composite materials in attempts using various means to make the propellers deform advantageously to maintain an efficient shape. The increased centrifugal acceleration load on the blade at take-off can be employed to twist the blade so that its back side rotates forward around the blade's center of pressure line, which is approximately parallel to and about one-fourth of the blade width back from the leading edge. Thus, the pitch is lessened. However, homogeneous aeroelastic propellers can only respond to stresses in a limited number of ways, sometimes by compromising other desirable characteristics, and are not capable of differential deflection.

Airplane propellers deform due to stresses of inertial loads including centrifugal force, and aerodynamic loads, including lift, drag, and pitching moment. Propeller pitch also varies dynamically along the length of the blades according to acceleration-induced loads. Air pressure is greater on the back side of the blade, due to the airfoil cross-section shape and to the pitch of the blade. There is a bending load which integrates towards the hub. Although the accumulating stress near the hub can be offset by a thicker cross-section, the bending load still results in the blade tips pulling ahead in the direction of flight, or "coning."

As the propeller rotates it is subjected to centrifugal force which increases away from the hub and straightens radial curves in the blades. Thus, both "coning" and twisting are somewhat offset.

For all points on the rotating blades to screw the same distance through the fluid, the tips, traveling through a longer arc, need a smaller angle of attack than the "root" of the blade nearer the hub. The ratio of forward/tangential speed is highest and forward speed is a greater factor in the effective angle near the hub. To track the optimum effective angle of attack at different forward speeds, the blade would have to change pitch by greater amounts nearer the hub. This problem is addressed neither by the conventional scimitar blade, nor by any other presently known method of changing blade twist along the length of the blade. Viewed from the front, the "scimitar" blades are swept rotationally aft with increasing radius. The central portion of the blade, having a longer moment arm from the primary axis of the blade, twists further and the tips further yet. Scimitar blades are dangerous because centrifugal force tending to straighten the blade exerts extreme tension on the trailing edge, which is the thinnest part of the blade. Failures become more likely above about 1300 rpm, while contemporary airplane engines operate in the range of 2000 to 4000 rpm.

Other attempts to use loads to controllably deform propellers have employed wood laminates. The Warnke Company of Tuscon, Ariz., has used plywood to construct one-piece aeroelastic propellers with straight blades which are curved back around the axis of rotation to counter the coning effect. Such propellers are reported to have exhibited some of the desired deformations under load. However, the wooden propeller must be hand carved and because of its relatively low strength cannot employ high efficiency thin airfoil sections. Like all naturally occurring materials, wood is inconsistent, unpredictable and always varies from piece to piece. Successes have been sporadic and a more consistent, reliable and higher strength structure is needed. Wood is not as strong as other propeller materials, and therefore wooden blades must be made thicker and less efficient than metal or advanced composite blades.

Various uniaxial fibers, for example glass, boron, carbon, or Dupont Kevlar ®, may be embedded in a stabilizing agent, such as epoxy resin, to form substantially unidirectional plies. The plies can be cross-laminated to produce a planar material with correspondingly different strengths along its axes depending on the fiber orientations. Fibers may be chosen with a lower elastic modulus than metals used in propeller construction, which allows them to bend more before breaking than metals of equal breaking strength. These lower elastic modulus materials also possess better vibration damping, impact and shatter resistance, fatigue strength, and generally higher reliability which, with their very high strength-to-weight ratios, make these materials highly desirable for aircraft construction. Fibers may also be chosen with higher modulus than conventional metal materials, and blends of various fibers may be selected to achieve a variety of specific mechanical properties, depending upon the structural performance desired in the final laminate. Such a fiber ply will bend in a predictable and reliable manner either parallel or at an angle to the fiber axes, and it has been speculated that this might be a useful characteristic in designing an aeroelastic propeller. Theoretical studies on advanced fiber laminate propellers are presented, for example, in a paper entitled "Aeroelastically Tailored Propellers" by Dwyer and Rogers at a meeting of the Society of Automotive Engineers, in April 1977 and in another paper entitled "Development of an Aircraft Composite Propeller" by Harlamert and Edinger at a Society of Automotive Engineers meeting in April 1979. Engineering techniques for calculating the bending strength of a laminate of plies at given orientations are explained in *Introduction to Composites* by Hahn and Tsai (Technomic Publishing Co., Westport, Conn.). However, the problem of orienting plies in a propeller for optimum non-uniform deflection has not previously been addressed and a practical and efficient aeroelastic laminated propeller taking advantage of these speculations has not previously been disclosed.

SUMMARY OF THE INVENTION

Therefore, objects of this invention include providing a propeller, or a propeller blade, which is constructed in one piece, has a high strength-to-weight ratio, is aeroelastically deformable to maintain an optimum range of pitch under various loadings, which will tend to make an engine operate at constant speed, and which is reliable and economical. These and other objects are attained in the present invention by the provision of a propeller blade made of an advanced composite of uniaxial fibers laminated in crossplies to take advantage of their high axial strength, which is typically ten to twenty times the strength transverse to the fiber axes. The bending strength of a laminate of plies at given orientations can be calculated by well-known engineering techniques. The thinness and high unidirectional strength of advanced fiber plies are exploited in assembling plies at various orientations in the blade to produce a propeller which responds to changing aerodynamic loads with differential deflection in the complex ways necessary to maintain an optimum shape. In one embodiment the average orientation of the plies is radially outward in the positive angular direction. This arrangement is modified in a second embodiment by reversing the average orientation of the plies from about the three-quarters radius to the tip. Various planforms may be used to better advantage, and, for scimitar planforms, reinforcing strips may be added to concave blade edges.

BRIEF DESCRIPTION OF THE DRAWINGS

FIG. 1 is a view from the front along the axis of rotation showing cross plies for a single twist uniform planform propeller which rotates counter-clockwise, as do the propellers in the other Figures;

FIG. 2 is a plan view of an inflected twist or "cranked" propeller showing plies in another embodiment of the invention;

FIGS. 3A-3D are a series of propeller cross-sections taken across FIG. 2 showing the center of pressure line as a point;

FIG. 4 is a plan view of a scimitar propeller showing plies arranged according to the invention;

FIG. 5 is a plan view of an inflected scimitar propeller showing plies arranged with reinforcing strips along the concave edges according to the invention; and FIG. 6 is a side view showing a hub and two single blades, the left blade removed for illustration and the right blade clamped at a selected angle into the hub fittings for a "ground adjustable" propeller.

DETAILED DESCRIPTION OF THE INVENTION

Propeller 10, shown in FIG. 1, is constructed of plies of Dupont Kevlar ® impregnated with a structural resin to form "pre-pregs" which are laminated in the arrangement described below. Propeller 10 flattens out under increased aerodynamic loading by twisting around its center-of-pressure line 50. FIG. 1 is an example of one embodiment in which the average orientation of plies is radially outward in the positive direction using plies 11, 15, 19 and 23 at 0° alternated with plies 13, 17, and 21 at 45°. Other combinations such as (0°, 30°) or (0°, 45°, 90°, 45°, 0°) are also possible. It should be understood that while a two bladed propeller is shown for illustration, the principles of this invention apply equally to propellers having three or more blades, and to single blades for mounting in a hub having blade clamps for ground adjustment of blade pitch. Because the plies can bend easily around the axes of the fibers, the trailing edge 29 is pushed forward around line 50 and the pitch flattens under increased loading. The propeller increases pitch with decreased loading at higher speeds. Blade 10 exhibits the laminate pattern for decreased pitch with increased loading which is a behavior characteristic of conventional scimitar blades, while blade 10 avoids the danger of trailing edge stress by using a uniform planform. Note that, in this front view, any given alternate ply extends further radially near the leading edge 28 than near the trailing edge 29. The greater number of plies on the top near the leading edge than near the trailing edge or the back of the blade at any given radius results in the desired airfoil shape. The thickest part of the blade at any radial distance is 40% of the blade width back from the leading edge. A sixty inch diameter propeller employing Kevlar 49 ® for plies 11, 15, 19 and 21 at 0° and Thornel T300 carbon fibers for plies 13, 17 and 21 at 45° (FIG. 1) is predicted to deflect differentially as listed in the following table when used on a light plane such as the Rutan "Varieze" flying at 8,000 feet altitude with a 118 horsepower engine turning at 2750 rpm:

| Percent Radius | Pounds Thrust Carried By Next 10% Of Blade | Actual Pitch Angle For Cruise at 180 mph | Actual Pitch Angle For Climb at 120 mph | Difference in Pitch Angle |
| --- | --- | --- | --- | --- |
| 50 | 13 | 36.6° | 26.45 | 10.15 |
| 60 | 14 | 31.75° | 22.52 | 9.23 |
| 70 | 15 | 27.94° | 14.56 | 8.38 |
| 80 | 14 | 24.90° | 17.27 | 7.63 |
| 90 | 11 | 22.42° | 15.45 | 6.97 |
| 100 | 0 | 20.37° | 13.97 | 6.40 |

As forward speed increases, a proportionately greater increase in actual pitch is required nearer the hub to maintain the same effective pitch for the entire length of the propeller. The inner part or "root" section of the blade should have the most variable pitch to flatten more under take off acceleration. However, the relatively small arc of rotation produces nearly negligible lift which, with the need for greater blade strength in the root section, compromises the need there for greater blade twist flexibility. The prescribed greater angle in the root section is not completely provided, and the greater lift capacity of the outer portion of the blade near the tip area is relied upon. Increasing lift with the square of the radius requires that maximum flexibility be allowed in the area approaching the three-quarters radius or "75% point." From the 75% point out nearly to the tip, lift remains high.

Blade pitch should decrease to offset greater tangential speed, and flexibility should be less to provide the smaller pitch variations than required near the hub to maintain effective pitch over a change in forward speed. The solution to this problem is that depending on its moment of inertia, center of stiffness, and fiber orientation, the blade will twist in the positive or negative direction around the center of pressure line 50. Blade 30 in FIG. 2 is only one example of the general arrangement by which the invention balances blade strength against stresses to obtain this behavior. A cross-ply arrangement as in propeller 10 is used for the root section of blade 30, and the average ply orientation is reversed for the tip area. As the radius of blade 30 increases, the thinner section causes the blade strength to decrease faster than the decrease in accumulated load. Hence, blade 30 twists more as radius increases. At about the 75% point the twist is arrested and reversed by having the average orientation of the innermost plies 31, 33, and 35, which are the only ones extending past the 75% point into the thin tip region, reversed. Aerodynamic loads then tend to reverse the blade twist towards the tip. Blade 30 thus exhibits the increasing and then decreasing pitch characteristic of an inflected scimitar blade, and by using a uniform planform avoids the above described concave-edge stress at the blade trailing edge.

FIGS. 4 and 5 illustrate how this invention can be combined with conventional planform shapes for scimitar 60 and inflected scimitar 80 planform blades, respectively. Scimitar blades constructed according to this invention are safer at high rotational speeds for two reasons.

First, as described above the ply orientation contributes to the aeroelastic deformation of the blade even before resorting to a scimitar planform. This means that a blade constructed according to the invention will exhibit the same behavior as a scimitar blade, with less exterior blade curvature, and that, at any given rotational speed, the concavely curved blade edges will not be subjected to centrifugal forces as high as in conventional scimitar blades.

Second, the uniaxial fibers used in this invention can be readily combined with the ply arrangements already described to form reinforcing strips 91 of uniaxial fiber plies embedded within the concave blade trailing edges. Although the trailing edges are the thinnest part of the blades, even a small mass of uniaxial material will impart sufficient tensile strength to resist the above-described centrifugal force. Blade 80 is shown with a trailing edge strip 91, which would be equally suitable for blade 60, and with a leading edge strip 90.

FIG. 6 shows how single blades 100 comprised of plies laminated according to any of the arrangements of this invention can be clamped between fittings 102 and 103 of a "ground adjustable" hub. A band 104 is tightened like a hose clamp on the fittings around the root 101 of each blade. Fitting 103 is secured by bolts, not shown, to shaft fitting 105 on shaft 106.

A preferred embodiment has been illustrated in detail, modifications and adaptations of which will occur to those skilled in the art. However, it is to be understood that such modifications and adaptations are within the spirit and scope of the present invention, as limited only by the following claims.

I claim:

1. An improved propeller blade of the type having a leading edge, a trailing edge, a root, a tip and an axis extending from the root to the tip, the improvement comprising:
   a laminate of a plurality plies of uniaxial fibers, said plies of uniaxial fibers oriented at varying angles to one another so the propeller blade pitch varies with the load on the propeller blade and with the axial position along the propeller blade, said plies of uniaxial fibers including a first set and a second set, said first set extending from said root to a position greater than about half way from said root to the tip, said second set extending from the root to the tip, the average axial orientation of said first set being radially outwardly and towards the leading edge of the propeller blade and the average axial orientation of said second set being radially outwardly and toward the trailing edge of the propeller blade so the blade exhibits increasing and then a decreasing pitch from the root to the tip.

2. The propeller blade of claim 1 further comprising structural means, extending between the root and the tip, for resisting centrifugal loads.

3. The propeller blade of claim 2 wherein the structural means includes a third set of radially oriented plies.

4. The propeller blade of claim 1 wherein the plies of uniaxial fibers are resin impregnated plies of uniaxial fibers.

5. The propeller blade of claim 1 wherein said position is about 75% of the distance from the root to the tip.

6. The propeller blade of claim 1 wherein said plies of uniaxial fibers extend different distances from the root toward the tip to provide the propeller blade with a decreasing cross-sectional area from the root to the tip.

7. The propeller blade of claim 1 wherein the propeller has a uniform planform.

8. The propeller blade of claim 1 wherein the propeller blade has a scimitar planform.

9. The propeller blade of claim 1 wherein said plies of uniaxial fibers include edge plies of uniaxial fibers positioned along at least one of the leading and trailing edges and oriented generally parallel to said at least one edge.

10. An improved propeller blade of the type having a leading edge, a trailing edge, a root, a tip and an axis extending from the root to the tip, the improvement comprising:
    a laminate of a plurality resin impregnated plies of uniaxial fibers, said plies of uniaxial fibers oriented at varying angles to one another so the propeller blade pitch varies with the load on the propeller blade and with the axial position along the propeller blade, said plies of uniaxial fibers including a first set and a second set, said first set extending from said root to a position substantially greater than half way from said root to the tip, said second set extending from the root to the tip, the average axial orientation of said first set being radially outwardly and towards the leading edge of the propeller blade and the average axial orientation of said second set being radially outwardly and toward the trailing edge of the propeller blade so the blade exhibits increasing and then a decreasing pitch from the root to the tip.

* * * * *